(12) United States Patent
Manuel et al.

(10) Patent No.: US 8,282,442 B2
(45) Date of Patent: Oct. 9, 2012

(54) CORRECTION OF CROWN LAYER VARIANCE DURING RETREADING

(75) Inventors: Stephen Manuel, Flat Rock, NC (US); Robert Young, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 375 days.

(21) Appl. No.: 12/680,561

(22) PCT Filed: Sep. 28, 2007

(86) PCT No.: PCT/US2007/079954
§ 371 (c)(1),
(2), (4) Date: Mar. 26, 2010

(87) PCT Pub. No.: WO2009/041980
PCT Pub. Date: Apr. 2, 2009

(65) Prior Publication Data
US 2010/0261412 A1    Oct. 14, 2010

(51) Int. Cl.
*B24B 49/00* (2006.01)
(52) U.S. Cl. .............. 451/5; 451/49; 451/51; 451/324
(58) Field of Classification Search .......... 451/5, 49, 451/51, 324, 54, 254, 258, 8, 10, 11
See application file for complete search history.

(56) References Cited

U.S. PATENT DOCUMENTS

| 3,553,903 | A |   | 1/1971  | Christie |
| 3,574,973 | A |   | 4/1971  | Rader |
| 3,633,279 | A |   | 1/1972  | Frazier et al. |
| 3,675,706 | A |   | 7/1972  | Cahill |
| 3,724,137 | A |   | 4/1973  | Hofelt, Jr. et al. |
| 3,866,360 | A | * | 2/1975  | Monajjem .................. 451/28 |
| 3,941,178 | A | * | 3/1976  | Simpson et al. ............. 157/13 |
| 4,062,716 | A |   | 12/1977 | Galantine et al. |
| 4,084,350 | A |   | 4/1978  | Ongaro |
| 4,126,171 | A |   | 11/1978 | Sorenson |
| 4,173,850 | A | * | 11/1979 | Gormish et al. ............ 451/28 |
| 4,486,255 | A | * | 12/1984 | Crommelynck et al. ..... 156/98 |
| 4,736,546 | A |   | 4/1988  | Ugo |
| 4,914,869 | A |   | 4/1990  | Bayonnet et al. |

(Continued)

FOREIGN PATENT DOCUMENTS
EP    1 189 014 A2    3/2002
(Continued)

OTHER PUBLICATIONS

JP 2003-510188 A—English abstract obtained from Espacenet (http://worldwide.espacenet.com) accessed on Feb. 3, 2012, 1 page.

(Continued)

*Primary Examiner* — George Nguyen
(74) *Attorney, Agent, or Firm* — Hahn Loeser & Parks LLP; Bret A. Hrivnak, Esq.

(57) ABSTRACT

Methods, apparatus and computer programs for correcting a crown layer variance of a buffed tire carcass, the steps of the method including measuring a distance through a buffed crown layer at a plurality of locations around a tire carcass; identifying a maximum distance location from the distances determined at the plurality of locations around the tire carcass; inflating the tire carcass with the maximum distance location orientated at the 270 degree polar angle position; and, buffing the tire carcass.

20 Claims, 12 Drawing Sheets

U.S. PATENT DOCUMENTS

| | | | |
|---|---|---|---|
| 5,005,628 A | 4/1991 | Kinuhata et al. | |
| 5,022,186 A | 6/1991 | Rogers, Jr. | |
| 5,067,539 A | 11/1991 | Kinuhata et al. | |
| 5,103,595 A | 4/1992 | Dale et al. | |
| 5,179,806 A * | 1/1993 | Brown et al. | 451/5 |
| 5,185,960 A * | 2/1993 | Majerus et al. | 451/258 |
| 5,216,372 A | 6/1993 | Zoughi et al. | |
| 5,238,041 A | 8/1993 | Tomita et al. | |
| 5,307,854 A | 5/1994 | Brewer | |
| 5,313,745 A * | 5/1994 | Mace et al. | 451/52 |
| 5,466,182 A * | 11/1995 | Marangoni | 451/254 |
| 5,639,962 A * | 6/1997 | Maloney | 73/146 |
| 5,941,338 A | 8/1999 | Miller et al. | |
| 6,005,397 A | 12/1999 | Zoughi et al. | |
| 6,086,452 A | 7/2000 | Lipczynski et al. | |
| 6,092,295 A | 7/2000 | Parrish | |
| 6,251,204 B1 | 6/2001 | Andersson et al. | |
| 6,257,956 B1 * | 7/2001 | Shteinhauz et al. | 451/8 |
| 6,386,024 B1 | 5/2002 | Marck et al. | |
| 6,386,945 B1 | 5/2002 | Fahringer et al. | |
| 6,405,146 B1 | 6/2002 | Engel | |
| 6,745,809 B1 | 6/2004 | Mory et al. | |
| 6,773,334 B1 | 8/2004 | Mallison | |
| 6,875,080 B2 * | 4/2005 | Gast et al. | 451/9 |
| 7,040,371 B2 | 5/2006 | Mory et al. | |
| 2002/0088527 A1 | 7/2002 | Tanaka et al. | |
| 2002/0106252 A1 | 8/2002 | Tsuzuki et al. | |
| 2002/0170652 A1 | 11/2002 | Parrish et al. | |
| 2004/0073339 A1 | 4/2004 | Ruoppolo | |
| 2004/0200579 A1 | 10/2004 | Mory et al. | |
| 2007/0004319 A1 | 1/2007 | Poling, Sr. et al. | |
| 2010/0130099 A1 * | 5/2010 | Manuel et al. | 451/5 |
| 2010/0261412 A1 * | 10/2010 | Manuel et al. | 451/5 |
| 2010/0330877 A1 * | 12/2010 | Manuel et al. | 451/5 |

FOREIGN PATENT DOCUMENTS

| | | |
|---|---|---|
| EP | 1 946 914 A1 | 7/2008 |
| JP | 2003-510188 A | 3/2003 |
| JP | 2006-192795 A | 7/2006 |
| WO | 01/23136 A1 | 4/2001 |
| WO | 2005/014267 A1 | 2/2005 |
| WO | 2007/029501 A1 | 3/2007 |

OTHER PUBLICATIONS

WO 2007/029501 A1—English abstract obtained from Espacenet (http://worldwide.espacenet.com) accessed on Feb. 3, 2012, 1 page.
JP 2006-192795 A—English abstract obtained from Espacenet (http://worldwide.espacenet.com) accessed on Feb. 3, 2012, 1 page.
PCT/US2007/079954 International Search Report Form PCT/ISA/220.
PCT/US2007/079954 International Written Opinion Form PCT/ISA/237.
PCT/US2007/065522 International Search Report, Form PCT/ISA/210 dated Jul. 24, 2008.
PCT/US2007/065522 International Written Opinion, Form PCT/ISA/237 dated Jul. 24, 2008.
PCT/US2007/072369 International Search Report, Form PCT/ISA/210/220 dated Dec. 5, 2007.
PCT/US2007/072369 International Written Opinion, Form PCT/ISA/237 dated Dec. 5, 2007.
PCT/US2007/072376 International Search Report, Form PCT/ISA/220 dated Dec. 12, 2007.
PCT/US2007/072376 International Written Opinion, Form PCT/ISA/237 dated Dec. 12, 2007.
PCT/US2007/072500 International Search Report Form PCT/ISA/210 dated Aug. 19, 2008.
PCT/US2007/072500 International Written Opinion Form PCT/ISA/237 dated Aug. 19, 2008.

* cited by examiner

| LOCATION | DISTANCE BETWEEN SENSOR AND TIRE BELT (mm) | CROWN LAYER THICKNESS (mm) |
|---|---|---|
| 1 | 7.5 | 2.5 |
| 2 | 7.4 | 2.4 |
| 3 | 7.6 | 2.6 |
| 4 | 7.2 | 2.2 |
| 5 | 7.3 | 2.3 |
| 6 | 6.9 | 1.9 |
| 7 | 6.9 | 1.9 |
| 8 | 7.1 | 2.1 |
| 9 | 7.0 | 2.0 |
| 10 | 7.1 | 2.1 |
| 11 | 7.3 | 2.3 |
| 12 | 7.2 | 2.2 |
| MAXIMUM | 7.6 | 2.6 |
| MINIMUM | 6.9 | 1.9 |
| DIFFERENCE | 0.7 | 0.7 |

CORRECTION OF CROWN LAYER VARIANCE DURING RETREADING

This application is a National Stage application of PCT application No. PCT/US2007/079954, filed Sep. 28, 2007, to which this application claims priority and the benefit of, the disclosure of which is also hereby incorporated by reference.

BACKGROUND OF THE INVENTION

1. Field of the Invention

This invention relates generally to tire retreading and more specifically, to buffing machines for buffing tread from a crown of the tire.

2. Description of the Related Art

Tires are known to comprise a tread consisting of an outer layer of rubber-based mixtures, of greater or lesser thickness, in which are molded various grooves and tread patterns intended, inter alia, to improve the vehicle's grip relative to the ground. A tire may also include undertread, which is similar in composition to tread material and is generally located between the tread and the belt.

In certain cases, it is necessary to machine or remove at least a portion of the outer surface of the tire, such as, for example, the tire tread and undertread, for the purpose of preparing a worn tire for retreading. Typically, the removal process has been accomplished by a machine containing a buffing head, the buffing head being one of various types of abrading devices, such as rasps, grinding wheels, and wire brushes. The removal process may also be achieved by a cutting process that utilizes a cylindrical cutter called a "peeler."

During the removal process, it may be desirable to monitor the amount of material remaining above the belt so that the removal device does not contact or damage the belt, which, if occurring would destroy the tire. Therefore, removal devices may use various types of sensors to monitor the amount of material remaining above the belt during the removal process. Such sensors are well known to those having ordinary skill in the art and an example of one is fully disclosed in U.S. Pat. No. 6,386,024, which is hereby fully incorporated by reference.

Generally, variations in tread and/or undertread thickness may result in tire imbalance or other degradation in tire performance or quality. To avoid any such impairment, it may be advantageous to determine whether the thickness of the material remaining above the tire belt (i.e., the "buffed crown layer") contains any variations. Therefore, it may be desirable to measure the buffed crown layer after the removal of material to ascertain any variations in material thickness about the tire, and to correct any such variations.

SUMMARY OF THE INVENTION

Particular embodiments of the present invention include methods, computer program products and apparatus for buffing a tire. Such buffing is performed to prepare the tire for a retreading process. Particular embodiments of methods of the present invention, that are methods for correcting a crown layer variance of a buffed tire carcass, have steps that include measuring a distance through a buffed crown layer at a plurality of locations around a tire carcass. Other steps may include identifying a maximum distance location from the distances measured at the plurality of locations around the tire carcass Particular embodiments of such methods may further include inflating the tire carcass with the maximum distance location orientated at the 270 degree polar angle position and buffing the tire carcass.

Particular embodiments of the present invention further include a computer program product including instructions embodied on a computer readable storage medium, the computer program product acting to correct a buffed layer variance of a buffed tire carcass. Such computer program products include instructions for performing the methods described above.

Particular embodiments of the present invention further include a tire buffing machine for buffing material from a crown of a tire. Such buffing machines include a sensor that provides a sensor output signal that is a function of a distance between the tire crown surface and a belt in the tire, a buffing head for buffing the tire, and a controller comprising a processor and a memory storage device that stores instructions executable by the processor, such executable instructions including instructions for performing the methods described above.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 10 is a table showing exemplary measurements representing distances between the sensor and the belt and the crown layer thicknesses at each of the locations identified in FIG. 8, according to an embodiment of the present invention.

DETAILED DESCRIPTION OF PARTICULAR EMBODIMENTS

Figure 1:
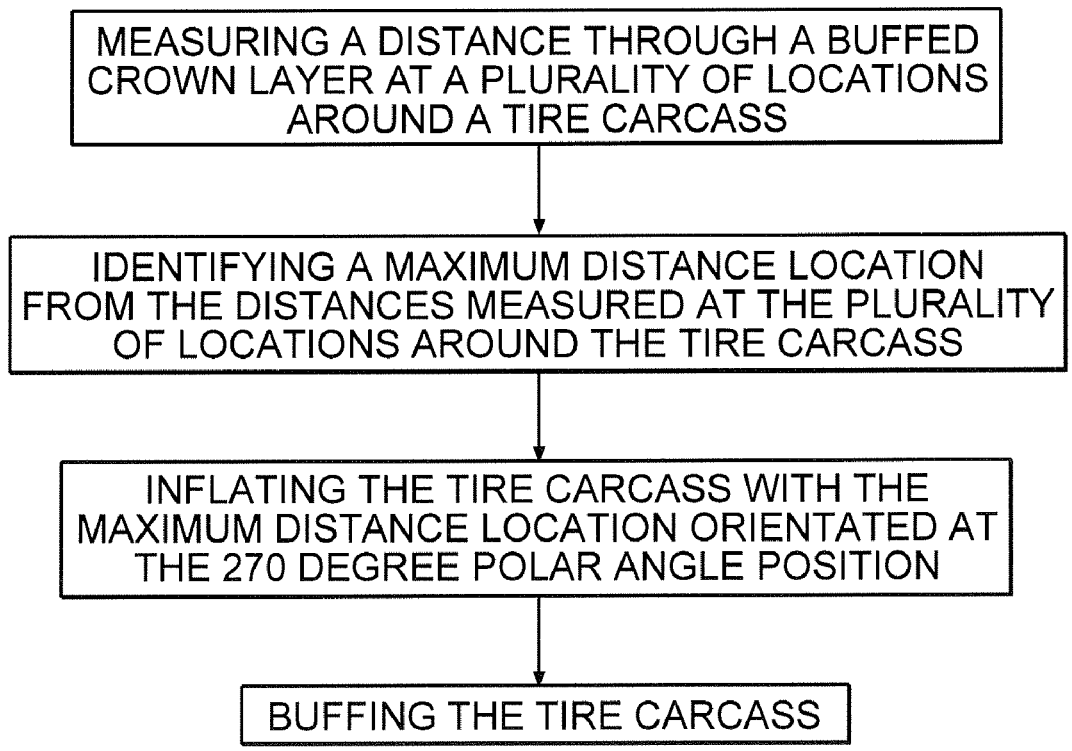
FIG. 1 is a flow chart describing a method for correcting a crown layer variance of a buffed tire carcass according to an embodiment of the present invention.

Particular embodiments of the present invention provide methods, computer programs and apparatus for correcting a crown layer variance of a buffed tire carcass that is being prepared for a retreading operation. Such preparation includes buffing the tread and/or undertread (the "material") from the crown of the tire to provide a buffed crown layer.

A tire buffing machine typically buffs the tread and/or undertread from a tire at a predetermined buffing radius that typically corresponds to the upper contour of the belt package. The buffing radius is defined by the length of the buffing radius and the location of the origin of the buffing radius. The belt package is below the tread and undertread of the tire and the casing is buffed to leave only a predetermined thin layer of material remaining over the top belt, i.e., the buffed crown layer. The buffing radius is selected for the tire being buffed so that, for example, a wide tire is buffed at a much larger buff radius than a narrow tire is buffed. The buffing radius typically has its origin located on the tire centerline, the line that passes perpendicularly through the lateral center point of the tire crown. It is conceived that the buffed crown layer may contain tread as well as undertread.

The buffing machine usually makes several side-to-side passes across the tire crown to remove the tread and/or undertread material, each removal pass removing additional material from the tire crown. These removal passes are made until the desired amount of material has been buffed from the crown to achieve a predetermined crown radius, and a remaining buffed crown layer.

The apparatus and methods useful for buffing tread and undertread crown material from a tire along a predetermined buffing radius are well known to one having ordinary skill in the art. For example, some buffing machines move the buffing head across a stationary but rotating tire to buff the tire along the arc described by the buffing radius. Other buffing machines move the tire across the stationary buffing head to buff the tire along the arc described by the buffing radius. Some buffing machines control the contact between the material and the buffing head by moving, for example, the buffing head along an X-Y coordinate system to buff the tire along the arc described by the buffing radius. Others, for example, control the contact between the buffing head and tire by pivoting the buffing head about a mechanical pivot point to buff the tire along the arc described by the buffing radius. It should be noted that the origin of the buffing radius is not a mechanical point or a mechanical pivot point, but is the origin of the buffing radius that describes the arc along which the controller of the buffing machine causes contact to be made between the buffing head and the tire crown.

Before a tire is buffed, the tire is mounted on a wheel or rim (collectively "rim"). The rim may be a conventional (non-expandable) rim or an expandable rim. After the tire is mounted on the rim, the tire is inflated to a desired pressure for buffing.

After the tire is buffed to the predetermined crown radius, the buffed crown layer (i.e., thin layer of material remaining above the belt) is measured to verify that the layer is void of any potential sources of tire imbalance or poor tire quality or performance. Particular embodiments include measuring the thickness of the buffed crown layer around the tire to determine whether the layer is uniform within a tolerance, or, in other words, whether there are any high or low spots within the layer that may negatively affect tire balance and/or tire performance. Variation in tread and/or undertread thickness may be caused by a variety of sources, such as, for example, imperfections in tire construction or curing, the effects of tire mounting and inflation, the type of rim on which the tire is mounted, and the effects of gravity. The belt may also be negatively affected by the sources, which may cause variations in the belt diameter and how the belt expands and otherwise operates under load and pressure. Therefore, variations in the tread and/or undertread thickness may also coincide with variations in belt diameter. For instance, in locations where the belt is at a lower diameter, excess tread and undertread material may migrate to fill this apparent void. Further, where there is an area of thicker tread and/or undertread material, the belt may be forced to a smaller diameter.

Measurements are made at discrete locations around the circumference of the tire. The measurements may be taken along a single circumferential path around the tire, where the path extends around the tire at a particular transverse location. Measurements may also be made at discrete transverse locations across the crown at different circumferences. Locations of maximum thickness are determined from the various measurements taken with the intent of correcting the thickened portion of the undertread layer. Before correcting the variation, the measurements may first be evaluated to determine if the variation in the buffed crown layer is sufficiently non-uniform to warrant corrective action. The buffed crown layer may be evaluated by subtracting a minimum undertread layer thickness from a maximum thickness and determining whether the difference is above or below a predetermined threshold value, or within a standard deviation limit. However, other techniques may also be used to quantify and/or determine the how much the thickness of the material remaining above the belt varies around the tire or the standard deviation thereof, and whether such deviation is within an acceptable level. If it is determined that the difference between a maximum thickness and a minimum distance is beyond a predetermined threshold value, the corrective actions and methods to reduce the maximum thickness will be employed. If, however, the difference is below the threshold, or within a standard deviation limit, then the undertread layer may be considered uniform and corrective action may be avoided.

As noted above, a non-uniform, i.e., inconsistent, buffed crown layer generally arises when it is determined that the thickness of the material remaining above the belt varies about the tire beyond a desired threshold value. Embodiments of the present invention correct the inconsistencies in the buffed crown layer by locating the areas of maximum thickness and orienting the tire to place an area of maximum thickness closest to the ground, i.e., rotating the tire to place a location of maximum thickness at the 6 o'clock position. Once properly orientated, the tire is deflated, the rim collapsed and re-expanded if the rim is an expandable rim, and the tire re-inflated so that the area of maximum thickness may be projected outwardly and/or downwardly, i.e., so that the belt may be expanded radially in the area of maximum thickness. Consequently, the tire is buffed to remove an excess amount of material from the area of maximum thickness. The tire may be rebuffed at the last buffing setting, i.e., at the last buffing radius, or, if it is determined that a desired amount of material is to be removed from the entire crown in addition to the excess material of the area of maximum thickness, then a different buff radius may be used.

Particular embodiments of the present invention include methods for correcting a crown layer variance of a buffed tire carcass. Particular embodiments of such methods may include the step of measuring a distance through a buffed crown layer at a plurality of locations around a tire carcass. Particular embodiments of the invention may include, as part of the step of measuring a distance, the step of receiving a signal response from a sensor, the signal response generated as a function of distances between the sensor and a belt in the tire carcass. In particular embodiments of the inventions, the measured distance is the thickness of the buffed crown layer. In other particular embodiments, the measured distance is the distance between a sensor and the tire belt. It is recognized that the tire may be spinning during the measurement process. It is also recognized that the signals are generated at various locations around the circumference of the tire. In one embodiment, these measurements are taken along a single circumference, i.e., along a circumferential path existing in a plane normal to the rotational axis of the wheel/tire assembly. It is also considered that measurements may also be taken at along discrete circumferential paths and/or transverse locations. The circumferential and/or transverse locations may be taken at particular increments, or may be taken arbitrarily.

The number of locations measured from which the signals are received may vary as widely as circumstances dictate. For instance, one or more measurements may be made relative to each segment of an expandable rim. In one example, twelve (12) measurements may be taken along portions of the crown that correspond to each of the twelve (12) segments of an expandable rim. The signal from the sensor is generated as a function of a distance between sensor and the belt of the tire. If the distance between the crown surface and the sensor are known, and such distance can be measured, then the distance between the crown surface and the belts can be determined by subtracting the distance from the sensor to the surface from the distance from the sensor to the belts. Thus, the signal from the sensor is also generated as a function of a distance between the crown surface and the belts of the tire. Therefore, particular embodiments of the invention may further include, as a part of the step of measuring a distance, the step of determining from the signal response, the distances between the sensor and the belt at a plurality of locations around the tire carcass.

With the intent of orienting the tire at a 6 o'clock position, i.e., at a 270 degree polar angle position from the tire's polar axis (the axis horizontally through the rotational axis of the tire), prior to the steps of inflating and buffing the tire, the methods may further include the step of identifying a maximum distance location from the distances determined at the plurality of locations around the tire carcass. Using the maximum distance location, the methods of particular embodiments of the present invention may further include the step of orientating the maximum distance location to a 270 degree polar angle position from a polar axis of the tire.

The methods may further include the steps of inflating the tire carcass with the maximum distance location oriented at the 270 degree polar angle position from a polar axis of the tire and buffing the tire carcass. Particular embodiments may include, as part of the step of buffing the tire carcass, the step of rebuffing the tire carcass at the last used buffing radius.

The measurements of the crown layer thickness remaining after a buffing pass, which were determined from the signals received from the sensor, may be used in particular embodiments as a step of determining if the layer of material above the belt remaining on the buffed tire carcass is uniform, i.e., the thicknesses of the material are within an acceptable level of deviation. As stated earlier, if the measured thicknesses at the plurality of circumferential locations are the same, or within accepted tolerance, then the buffed tire maybe acceptable and corrective action may be avoided. If the measured thicknesses show that the thicknesses are greater at an at least one location beyond an acceptable level or threshold, then the tire may be considered non-uniform. Particular embodiments of the invention may further include identifying a minimum distance location from the distances determined at the plurality of locations around the tire carcass. Further, particular embodiments may also include calculating the difference between the maximum distance and the minimum distance, comparing the difference to a threshold value, and performing the steps of inflating and buffing if the difference is greater than the threshold value.

As stated above, variations in the buffed crown layer may be related to the rim upon which the buffed tire carcass is mounted. In particular, expandable rims may cause variation in the buffed crown layer as various segments of an expandable rim may not fully extend to completely engage the tire. It is this variable and inconsistent tire engagement that may cause variation in the buffed crown layer and/or the belt. Therefore, if the tire carcass was buffed to a predetermined crown radius while mounted upon an expandable rim, particular embodiments of the invention may include the steps of deflating the tire carcass, disengaging an expandable rim from the deflated tire carcass while the maximum distance is located at a 270 degree polar angle position from a polar axis of the tire, and reengaging the expandable rim with the deflated tire carcass while the maximum distance is located at a 270 degree polar angle position from a polar axis of the tire prior to the step of inflating the tire carcass.

It has been found that after initially mounting a tire to be buffed to a predetermined crown radius, rotating the tire during inflation or pressurization may reduce variations along the tire tread and/or undertread that may lead to a non-uniform buffed crown layer. Therefore, particular embodiments of the invention may include the steps of rotating a tire carcass during inflation and buffing the tire at a buffing radius to a predetermined crown radius prior to performing the steps of the methods above.

The methods described herein, and shown in part in FIG. 1, may be employed by a tire buffing machine and embodied in computer software. The methods and the manner in which they are employed or practiced in exemplary embodiments are discussed in further detail below.

Figure 5:
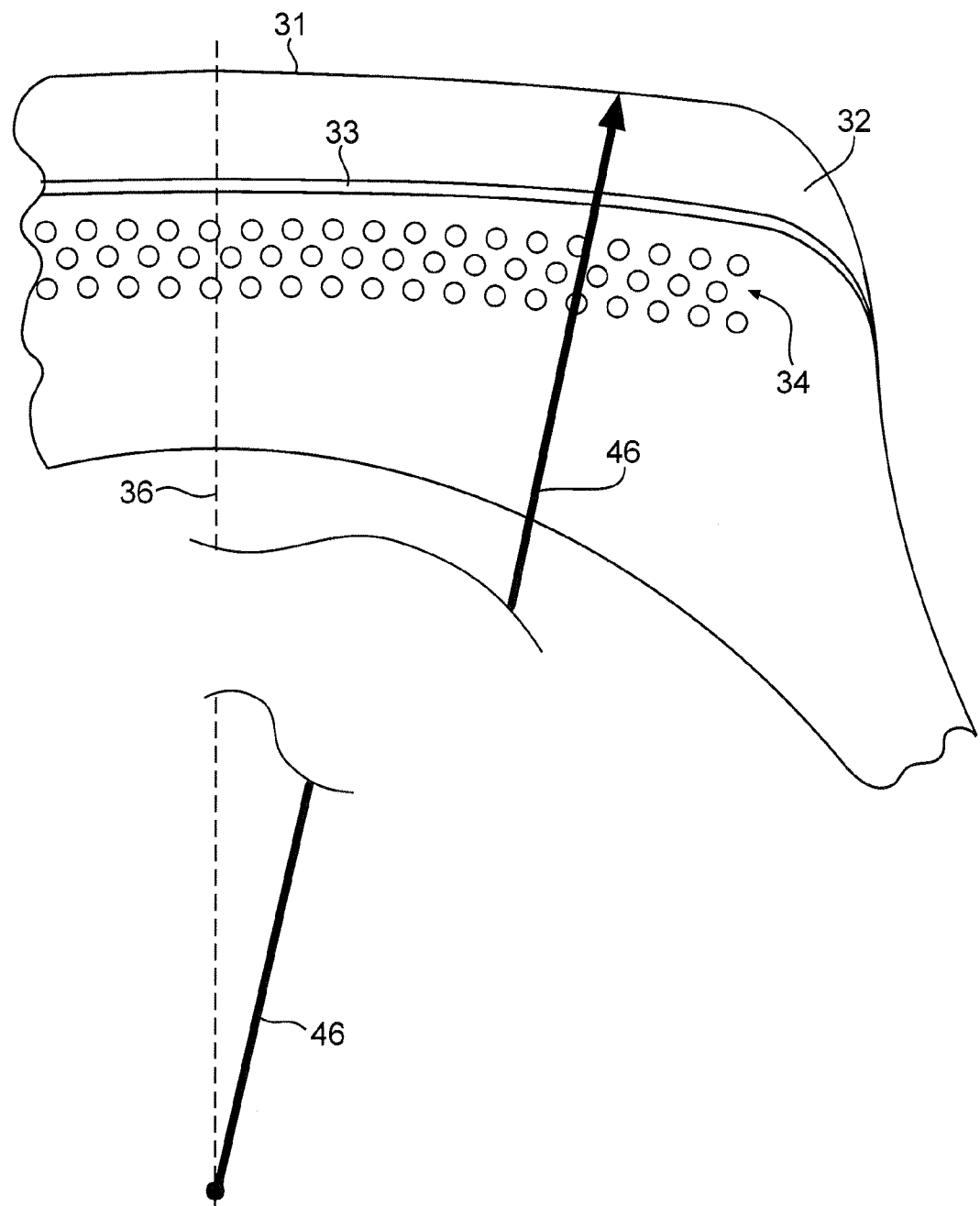
FIG. 5 is a cross-sectional view of a cross-section portion of the tire of FIG. 2 showing a buffing radius.

FIGS. 2-6 generally disclose a tire buffing machine 10 that is adapted to measure and remove tread 32 and/or undertread 33 from a tire crown 31 according to the methods, computer programs and apparatus of particular embodiments of the present invention. Buffing machine 10 is adapted to buff the tread and/or undertread material from a tire at one or more selected buff radii 46 as shown in FIG. 5. It follows that buffing machine 10 may successively remove material at discrete buff radii until reaching a predetermined crown radius.

Each buff radius 46 is defined by a length and an origin position. When the tire crown is buffed at a particular buff radius 46, the crown outer surface forms a curve or arc that is described by the buff radius. The origin position may generally be located along a plane extending through the centerline of the tire crown; however, it is contemplated that imperfections in the tires and the buffing machine may result in asymmetries and require the origin to be located to either side of the centerline plane.

The buffing machine 10 generally includes a material removal tool or buffing head 12, at least one sensor assembly 14, 18 and sensor output 26, a programmable logic controller 20 or other device having a processor that can execute programmed instructions, such as, for example, a personal computer or main frame computer, and a user interface 28. The buffing head 12 removes tread 32 and/or undertread 33 material from the crown 31 of the tire 30, and may comprise any device capable of removing such material from a tire, including, without limitation, abrading devices, such as rasps, grinding wheels, and wire brushes, and cylindrical cutters or "peelers."

Optionally, as known in the art, the buffing machine 10 may also include one or more buffing heads 12. A buffing machine having a single buffing head 12 is commonly referred to as a single head buffing machine, while a buffing machine having two buffing heads 12 is referred to as a dual head buffing machine. It is noted that the present invention may be implemented on any type of buffing machine that removes tread 32 and/or undtertread material 33 from a tire 30 along an arc described by a buffing radius.

Sensor assemblies 14, 18 are generally used to measure the amount of material above the tire belt 34. Such material generally includes tire tread 32, but may also include other material, such as for example undertread 33. In is contemplated that buffing machine 10 may include one or more sensors capable of measuring the amount of material 44 above the belt, and/or capable of obtaining the distance 42 between the sensor and the belt. By way of example, a buffing machine 10 may include one or more of either sensor assemblies 14, 18. Each sensor assembly 14, 18 includes a sensor 14a, 18a. Sensor assembly 14 includes an arm 16 that rotates between engaged and disengaged positions by way of cylinder 17. Sensor assembly 18 includes an extendable arm 19 that slidably translates between engaged and disengaged positions. It is contemplated that any mechanism may be used to engage and disengage a sensor. Further, it is contemplated that any available sensor or sensor assembly may be used to practice the inventions disclosed herein, as the sensors and sensor assemblies shown only exemplify possible embodiments thereof.

In one embodiment, as exemplified by sensor 14a, a sensor may be operably mounted in a fixed relation to the buffing head 12, which may rotate, translate, or pivot. Such a sensor may also scan or measure the amount of material remaining above the belts 34 before, after, or while the buffing head 12 buffs the crown 31. Being operably mounted in a fixed relation to the buffing head 12 means that the sensor 14a, when operating, is located at a constant relationship to the buffing head 12. In other words, when the buffing head 12 moves transversely across the tire crown 31, the sensor 14a moves along in a fixed position to the buffing head. On a buffing machine having a buffing head that pivots about a mechanical pivot point, then the sensor may be mounted on the pivoting member so that the sensor mounting moves with the buffing head as the buffing head pivots. On a buffing machine having a buffing head mounted on a pedestal that moves along an X-Y coordinate system, then the sensor may be mounted on the pedestal so that the sensor mounting moves with the buffing head as the buffing head moves along the X-Y coordinate system.

Because the buffing machine 10 is controlled by the controller 20 to buff the tire along an arc described by the buff radius, one having ordinary skill in the art will readily realize that the location of the sensor 14a can easily be determined because of the senor 14a is operably mounted in a fixed relation to the buffing head 12. Since the controller 20 can determine exactly where the buffing head 12 is in relation to the centerline of the tire 36 as it controls the area of contact between the buffing head 12 and the tire 30, the controller 20 can determine the location of the sensor 18 that is in an operably fixed relation to the buffing head 12 by the use of simple trigonometric and/or math functions. In this manner, the controller 20 can determine each of the plurality of transverse locations from which it receives the signals from the sensor 14a.

Figure 9:
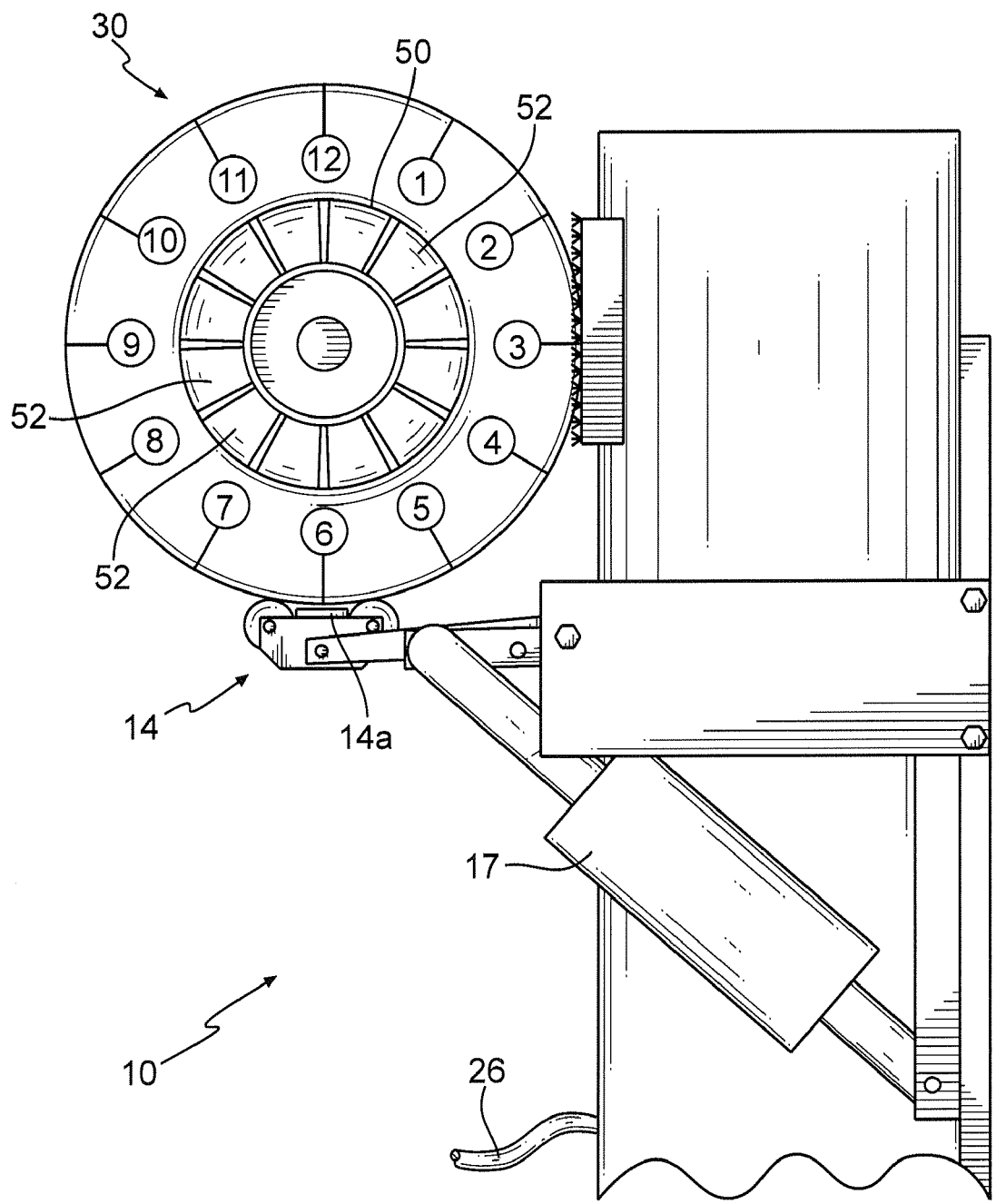
FIG. 9 is a side view of the tire buffing machine and tire of FIG. 2 showing exemplary locations for measuring the tire tread, according to an embodiment of the invention.

In a similar manner, because the angular rotation of the tire is controlled by the controller 20 and the location of sensor 14a is known, controller 20 can determine each angular location about the tire's rotational axis from which it receives a signal from sensor 14a. The rotational axis is the center of the axle. The angular location may be quantified by any desired coordinate system, such as the polar coordinate system. In the polar coordinate system, the angular location is measured in degrees with reference to the polar axis, which extends horizontally through the tire's rotational axis. With reference to FIG. 9, the polar axis would extend through measurement locations 3 and 9. Measurements are made counterclockwise from the line segment between the origin (the axle center) and measurement location 3. Consequently, measurement location 3 would be 0 degrees, location 12 would be 90 degrees, location 9 would be 180 degrees, and location 6 would be 270 degrees. Further, a 6 o'clock position would be equivalent to a 270 degree polar angle from the polar axis. Therefore, a tire may be oriented manually or automatically by the buffing machine 10, according to the methods described above, since the angular location of each crown layer measurement is known.

It is also contemplated that a sensor may be independent of the buffing head 12 and/or may be located on a device or machine independent of, or other than, the buff machine 10, which is exemplified by sensor assembly 18 and sensor 18a. In this configuration, the sensor 18a may remain in a fixed transverse position, which may be adjustable to place sensor 18a at any transverse location along the tire crown 31, or a servo device, for example, can move sensor 18a across the tire crown 31 to provide input into the controller 20 as to the location of the sensor relative to the centerline 36 of the tire. Such devices are well known and are fully described in U.S. Pat. No. 6,386,024. Because sensor 18a is located at a particular known location with respect to the tire 30 and the buffing machine 10, and because the angular rotation of the tire 30 is controlled by the controller 20, controller 20 can determine each angular location of each crown layer measurement made around the tire, from which it receives a signal from sensor 18a, as discussed in the previous paragraph.

Alternatively, in other embodiments, the sensor may be a series of individual sensing devices mounted in fixed relation to the rotating tire. For example, a first sensing device may be mounted above the crown at the centerline 36, a second and third sensing devices mounted at a fixed distance on either side of the first sensing device and so forth. This series of sensing devices is an exemplary embodiment of a sensor (collection of sensing devices) providing a signal from each of a plurality of transverse locations (the location of each of the sensing devices) across a portion of the tire crown, the sensor scanning a transverse path across the crown of the tire.

Sensors 14a, 18a are generally located radially above or outward from the crown 31 and may or may not be located at an offset distance 40 above the tire crown 31. Sensors 14a, 18a may comprise an ultrasonic, magnetic or inductive proximity sensor for measuring the distance between sensors 14a, 18a and belt 34. However, it is contemplated that any other sensor type may be used, including those capable of locating non-ferrous cord material. For a single head buffing machine, a single sensor may be associated with the single buffing head 12. A dual head buffing machine may include two sensors, with each sensor being associated with one of the buffing head 12.

Sensors 14a, 18a generate a signal response as a function of the distance 42 between the sensors 14a, 18a and the tire belt 34. The signal response may be represented by a value, which may represent current, voltage, resistance, or any other characteristic of the signal response. Ultimately, the signal is sent to the programmable logic controller 20 by way of input/output (I/O) cable 26 for evaluation and processing.

The controller 20 interprets the received signal as a distance between the belt 32 and each of the sensors 14a, 18a. If a sensor is in substantial contact with the crown 31, which may comprise tread 32 or undertread 33 due to the removal of material from the crown 31, the signal generally represents the thickness of the material above belt 34. If a sensor is an offset distance from the crown 31, the material above belt 34 equals the distance measured by the sensor minus the offset distance 40. Without limitation, the signal may also be sent by wireless communication to controller 20, such as without limitation by infrared signal or radio frequency, by one or more cables, including without limitation fiber optics, or any other method or means known to those having ordinary skill in the art.

Programmable logic controller 20 generally receives signal responses from sensors 14a, 18a to monitor and help control the amount of material being removed from tire 30. In a known way, the controller 20 manipulates the buffing head 12 and/or the tire 30 so that the buffing head 12 contracts and buffs the tire 30 along the arc described by the buffing radius. In particular embodiments of the present invention, the controller 20 further interprets the signals received from the sensor 18 as the measured distance between the crown surface and the belts 34.

Figure 7:
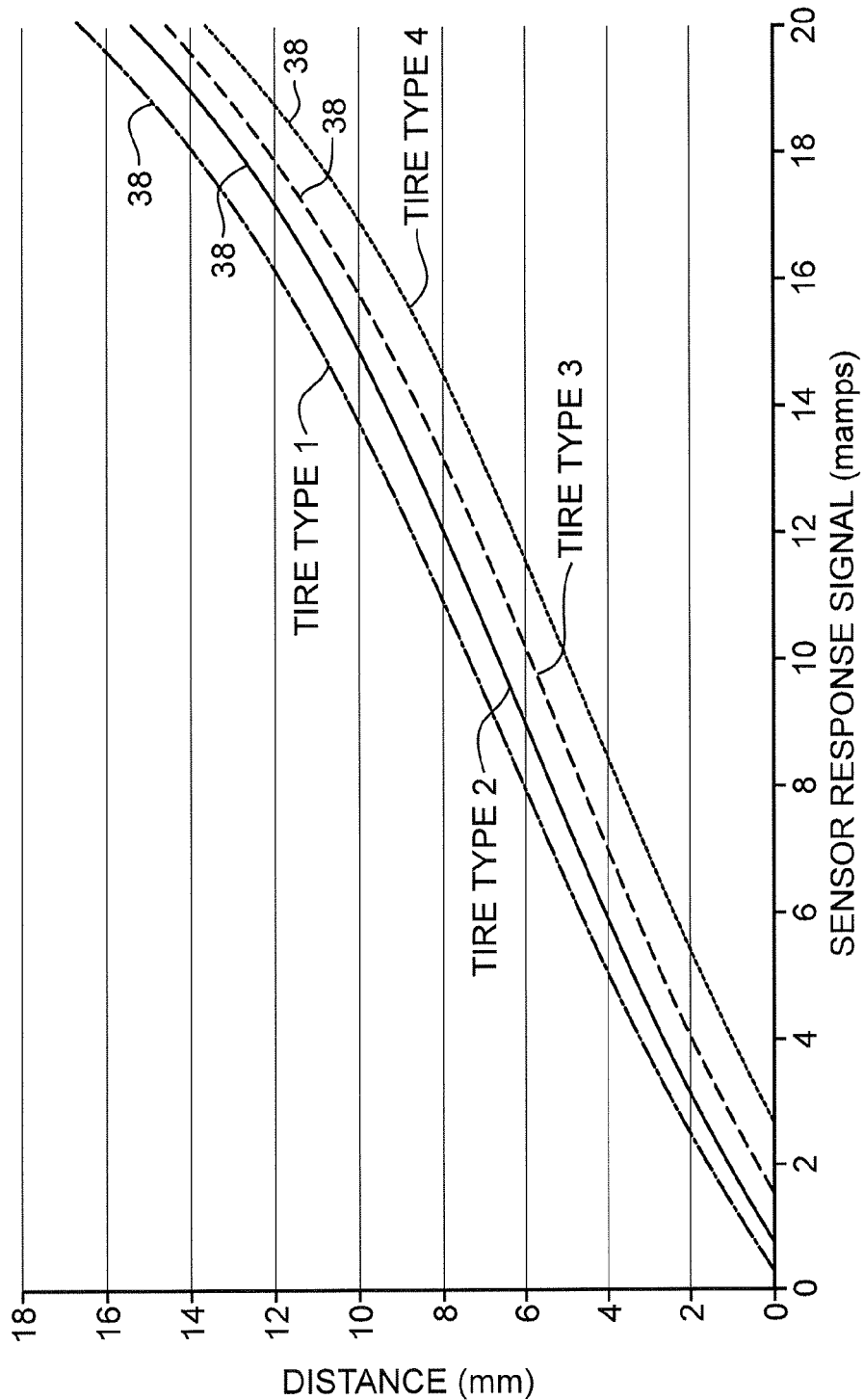
FIG. 7 is a graph showing a plurality of signal response curves according to an embodiment of the invention.
Figure 8:
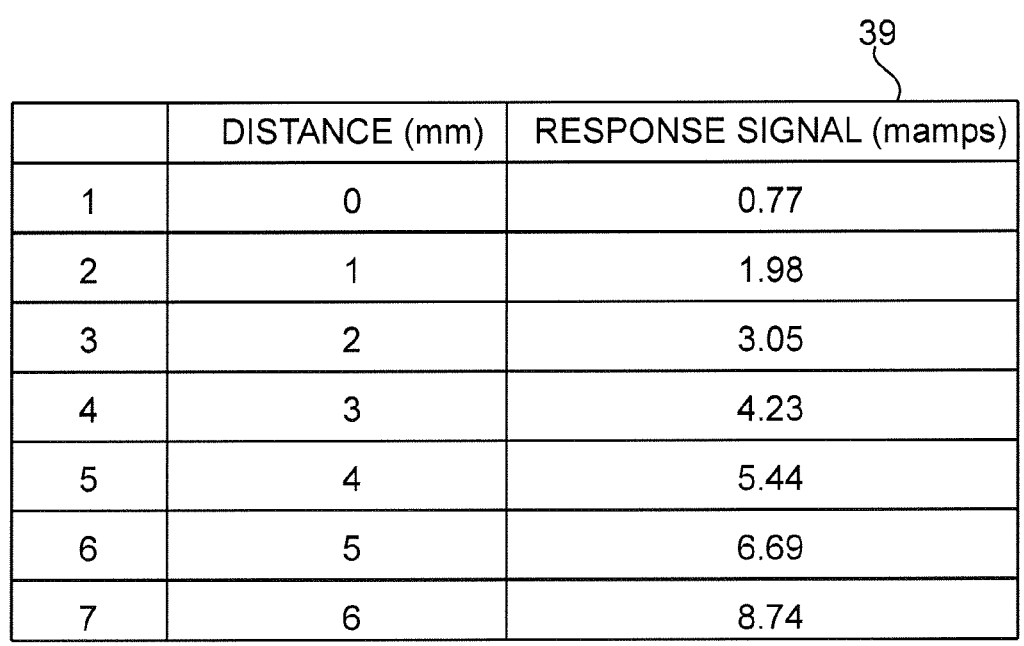
FIG. 8 is a table showing a plurality of signal responses with corresponding distances according to an embodiment of the invention.

In particular embodiments, the controller 20 may utilize signal-distance functions or tables (i.e., signal response curves 38 as shown in FIG. 7 to convert a signal response into a corresponding distance, such as the signal response curves disclosed in PCT application No. PCT/US07/65522, filed Mar. 29, 2007 and hereby fully incorporated by reference. Controller 20 includes a logic processor 21, which may be a microprocessor, a memory storage device 22, such as RAM (random access memory), ROM (read-only memory), PROM (programmable read-only memory) and at least one input/output (I/O) cable 26 for communicating with the buffing machine 10. Further, the controller 20 may include an I/O slot 23 for housing an I/O card having I/O cable connector 27. An operator may utilize a user-interface 28 to monitor the sensor measurements and to program, or otherwise control or instruct, the operation of controller 20 and the buffing machine 10, which includes performing each step and method associated with determining a new or corrected buff radius origin position as detailed below. The user-interface 28 and the controller 20 may communicate by way of I/O cable 27. It is also contemplated that wireless communications may exist between the controller 20, the user-interface 28, and the buffing machine 10.

Generally, the controller 20 may be programmed by any known graphical or text language. Programmed instructions, data, input, and output may be stored in a memory storage device 22, which is accessible to the processor 21. Particularly, programmed instructions related to the methods disclosed herein may be stored in the memory storage device and executed by the processor 21. The memory device 22 may comprise any commercially known storage device, such as hard disk drives, optical storage devices, flash memory, and the like. The processor 21 executes programmed instructions and may perform the distance calculations and measurements, and execute the instructions pertaining to the methods disclosed herein as well as other operations discussed herein. The memory storage device 22 also stores inputs, outputs, and other information, such as, for example, functions and tables representing signal response curves 38 for use by processor 19 in performing its operations. In addition to performing distance conversions and measurements, the controller 20 may also be programmed to generate signal response curves 38, which may also be expressed as tables 39, based upon received input.

Figure 6:
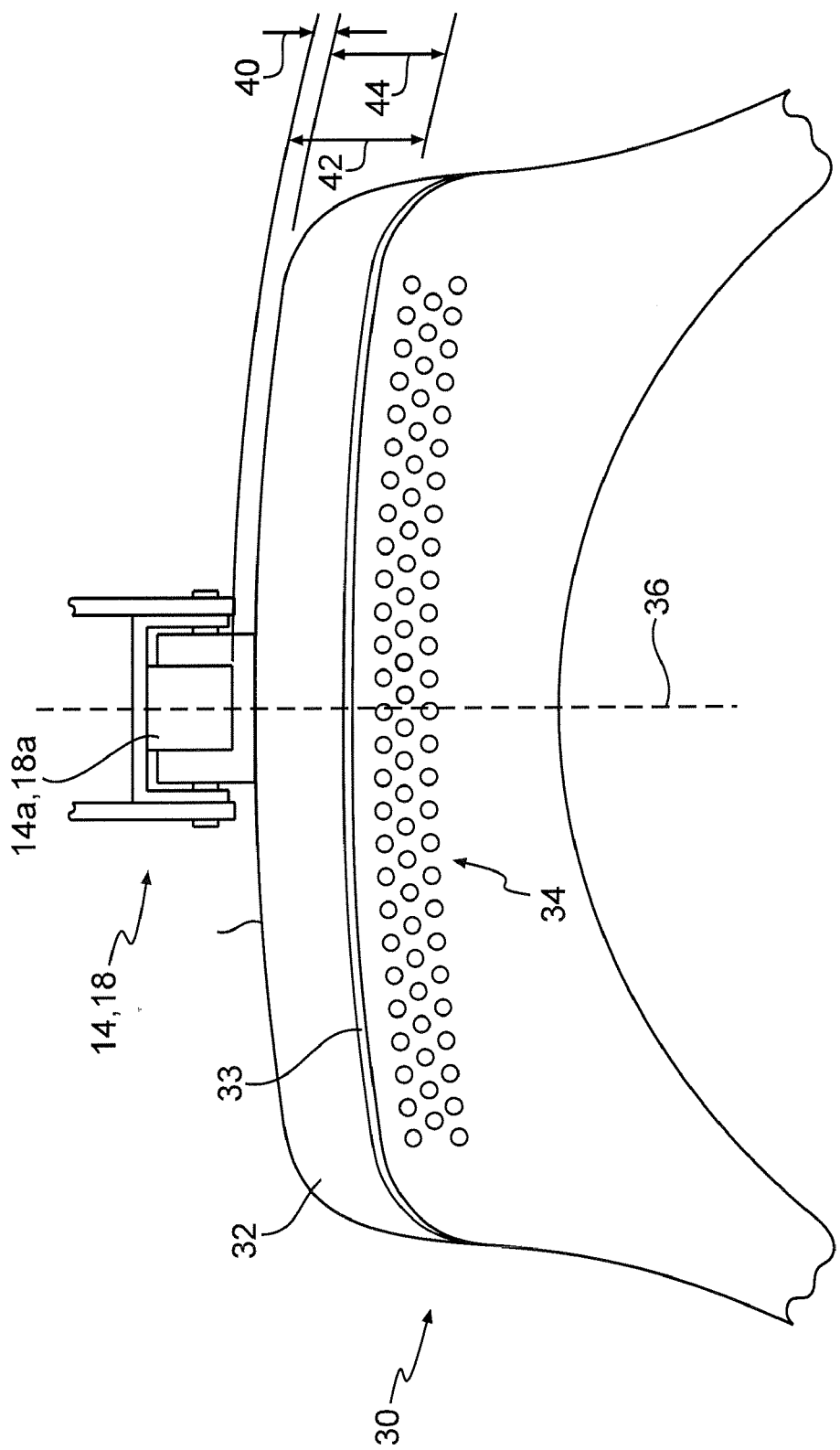
FIG. 6 is a cross-sectional view of the tire and sensor portion of FIG. 2.

With reference to FIGS. 6 and 7, signal response curves 38 may be used by the controller 20 to convert signal responses received from each of the sensors 14a, 18a into distances. The signal response curves 38 are generally functions of the distance 42 between a sensor 14a, 18a and belt 34, and relate a signal response to a distance. The signal response curves 38 may be stored in a memory storage device 22 as a function or as a table. The processor 21 utilizes a desired signal response curve to determine the distance corresponding to the signal received.

More specifically, in an exemplary embodiment, the distance is determined from a function that represents signal response curve 38, which may be linear or non-linear. In another embodiment, the distance is determined from a table 39 that represents signal response curve 38, by locating from the table the two signal responses closest in value to the signal response received and then obtaining a linear relationship between the two signal responses and their corresponding distances. From the linear relationship, a distance is determined for the signal response received. The linear relationship may comprise a linear function or may be based upon a percentage or ratio relating the signal received to range between the two points selected from the table. If, by chance, the signal response received is substantially equivalent to a signal response within a table 39, the corresponding distance may also represent the distance of the received signal response.

Because signal responses may vary from tire to tire, a plurality of signal response curves 38 may be provided in exemplary embodiments, where each response curve 38 represents a tire or a plurality of tires sharing a common tire characteristic, such as, for example, a tire size, shape, construction, manufacturer or brand, or a tread profile. Consequently, to more accurately control material measurement and removal, the processor 21 selects a signal response curve 38 based upon a known tire characteristic, or based upon certain information or instructions received from an operator. Signal response curves 38, as functions or as tables 39, are generally stored in a memory storage device 22 and used by the processor 21 to determine the distances according to programmed instructions reflecting the above stated methods.

The sensor 18 may be used to scan the crown layer, i.e., the tread 32 and/or undertread 33, at a plurality of circumferential and transverse and locations across at least a portion of the tire crown, and measure at each location the distance between a sensor 14a, 18a and the belt 34, before, during, or after a buffing pass by buffing head 12. When preparing a tire for retreading, it is desirable to have a minimal and substantially consistent thickness of tread and/or undertread remaining above the belt 34.

It has been found that even after buffing the tire to a predetermined crown radius, variations in the buffed crown layer thickness may remain. Variations in thickness may be attributed to a variety of sources, such as, for example, inconsistencies in tire construction and curing processes, inconsistencies in buffing, tire mounting and inflation techniques, the type of rim on which the tire is mounted, and gravity. Variations in the belt 34 may also coincide with an increase in tread and undertread thickness. For example, thicker tread and/or undertread may limit belt expansion and cause a lower local belt diameter, and vice versa, which assumes that the tire outside diameter is substantially consistent.

As stated previously, variations may arise due to the type of rim on which the tire is mounted. In retread applications, tires are commonly mounted on expandable rims. Expandable rims 50 generally include segments 52, each of which extend and retract to quickly and easily mount and dismount tires.

Figure 2:
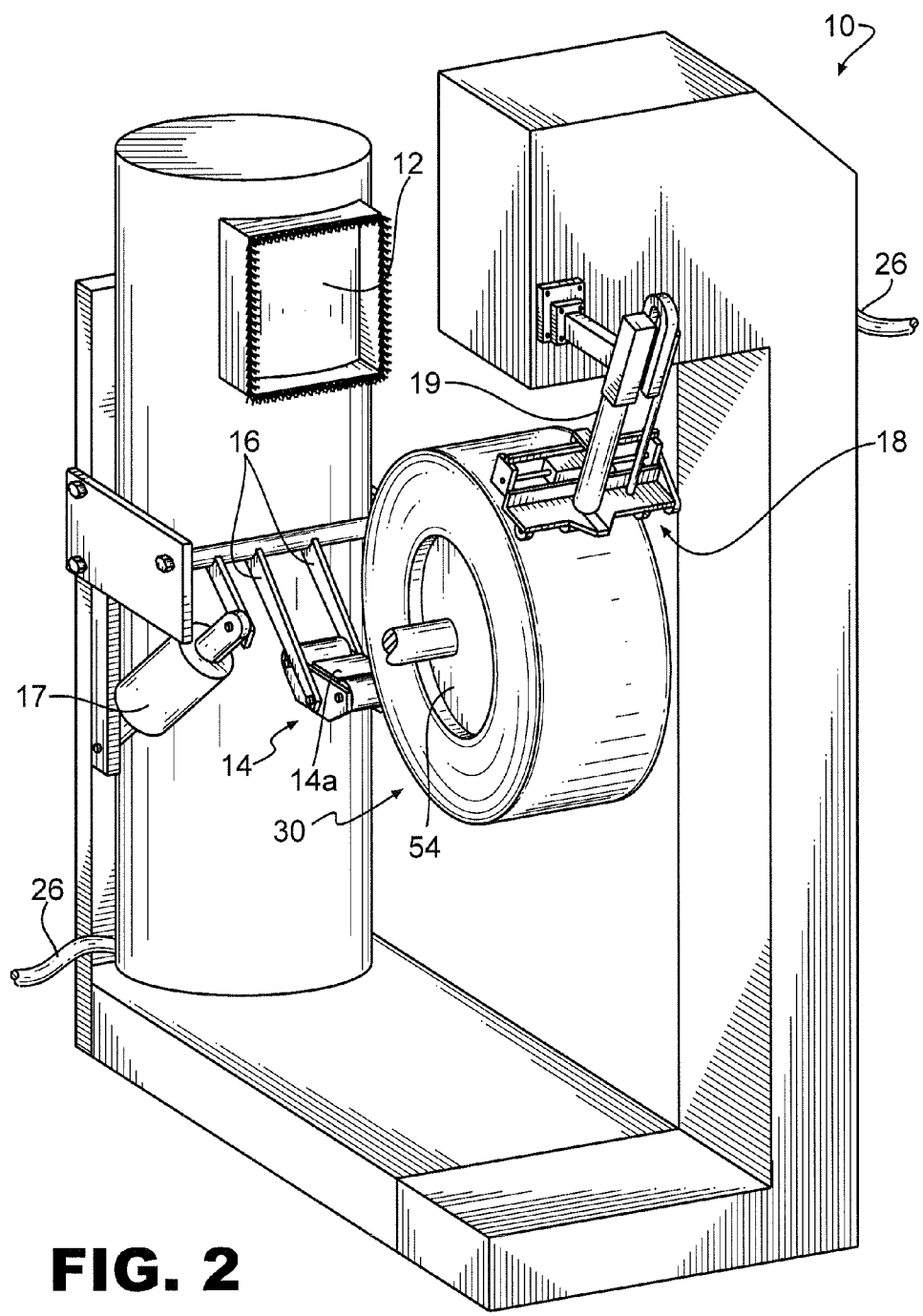
FIG. 2 is a perspective view of a tire buffing machine according to an embodiment of the invention.
Figure 3:
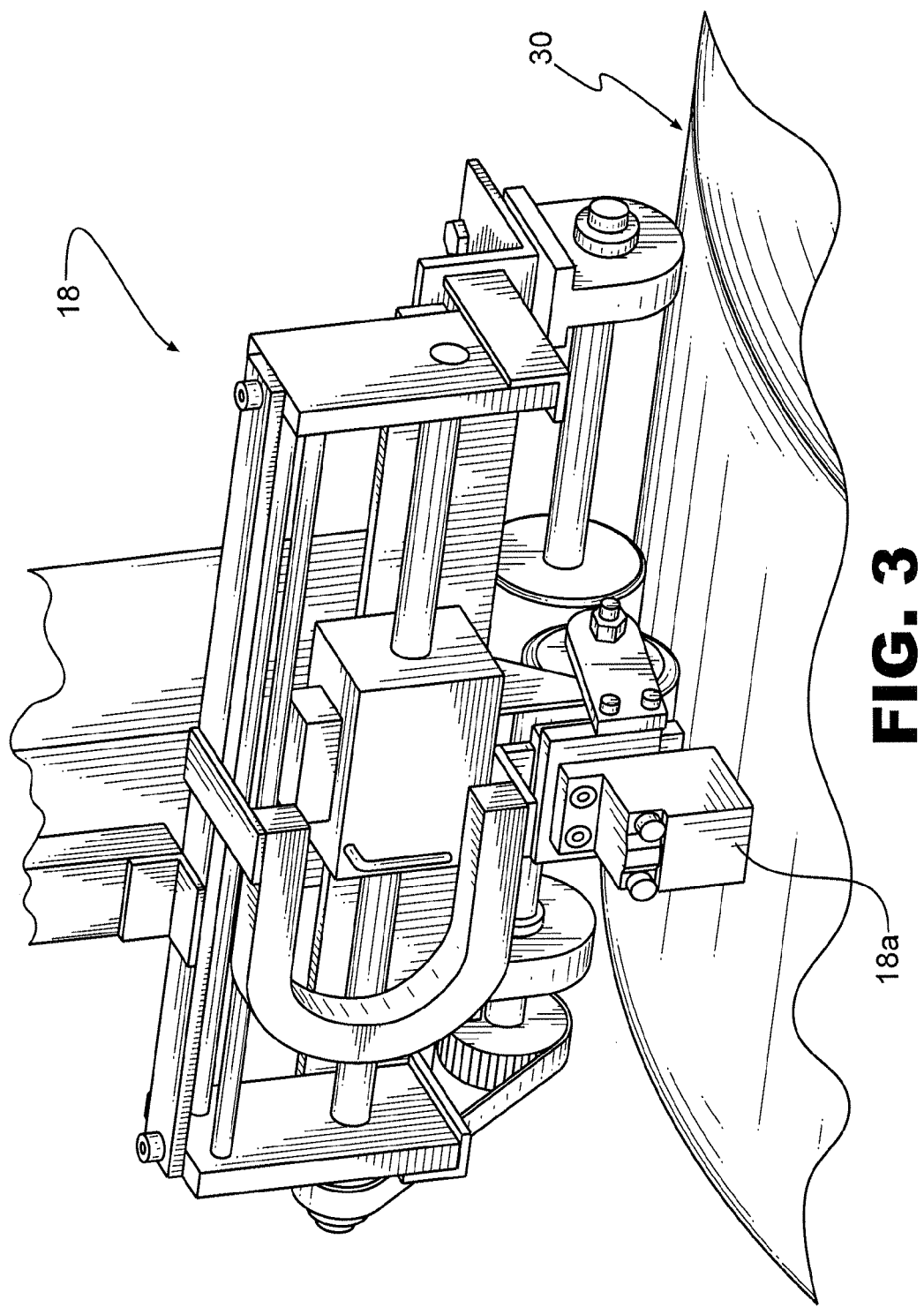
FIG. 3 is a perspective view of the tire and a sensor portion of the buffing machine of FIG. 2.
Figure 4:
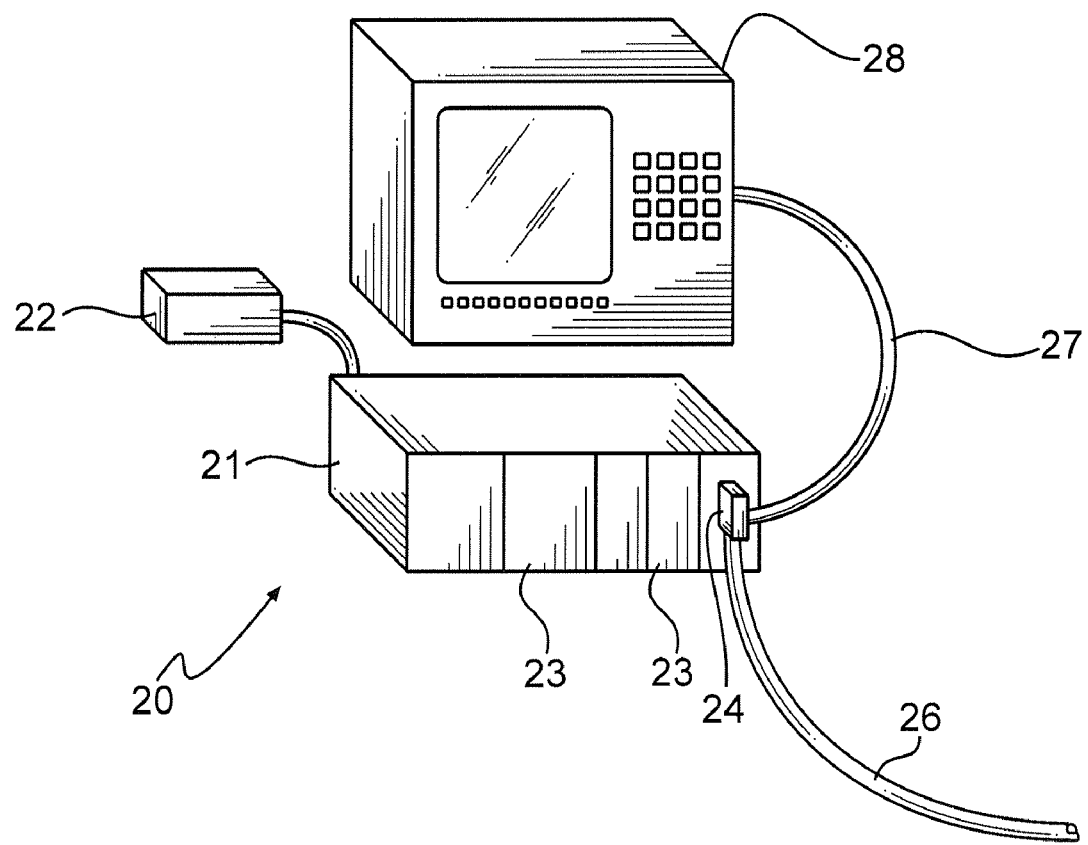
FIG. 4 is a perspective view of a controller of the machine of FIG. 2.
Figure 11:
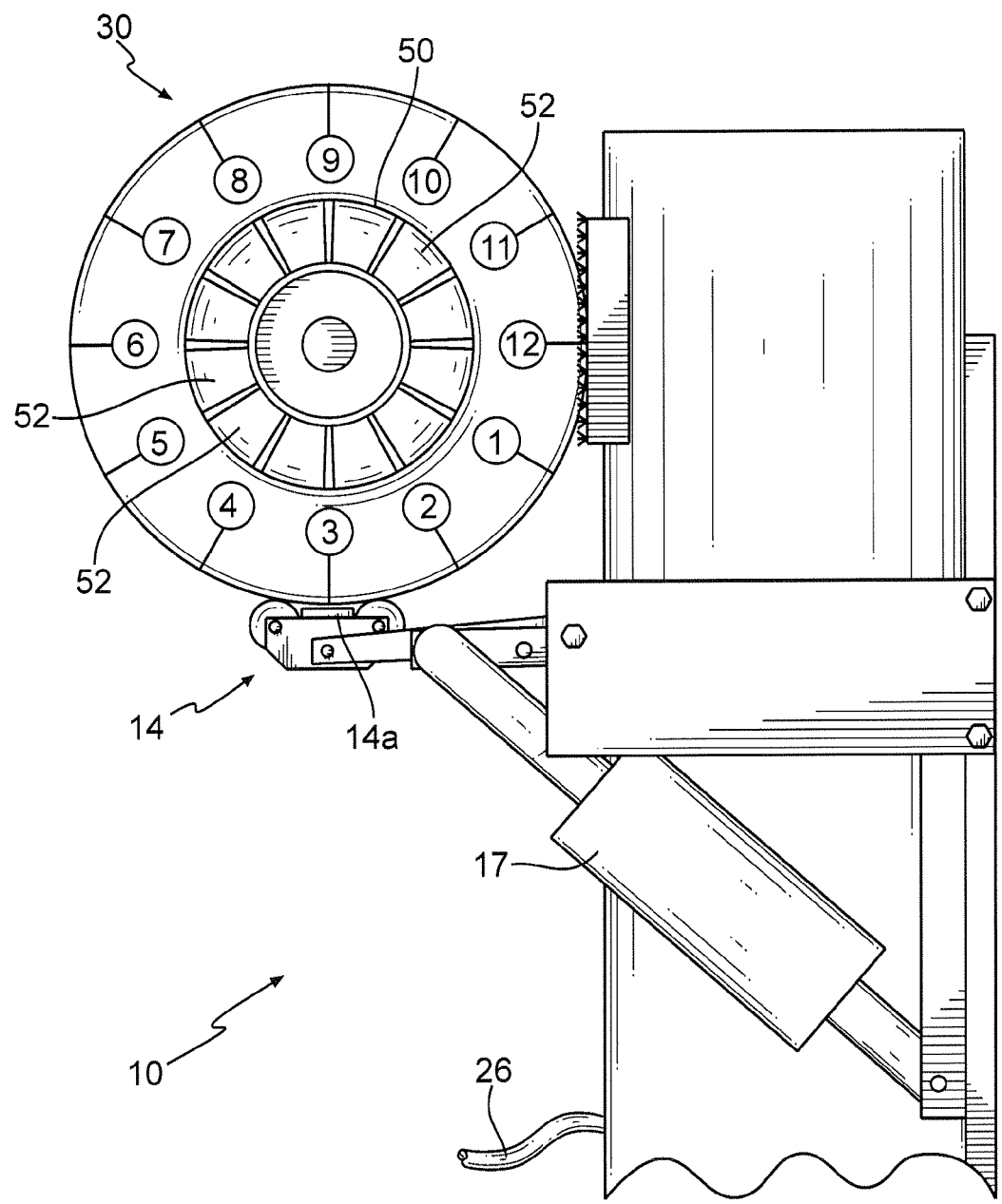
FIG. 11 is a side view of the tire buffing machine and tire of FIG. 9 showing the tire rotated to orient a maximum crown layer thickness location identified in FIG. 10 to a 6 o'clock position on the buffing machine, according to an embodiment of the present invention.
Figure 12:
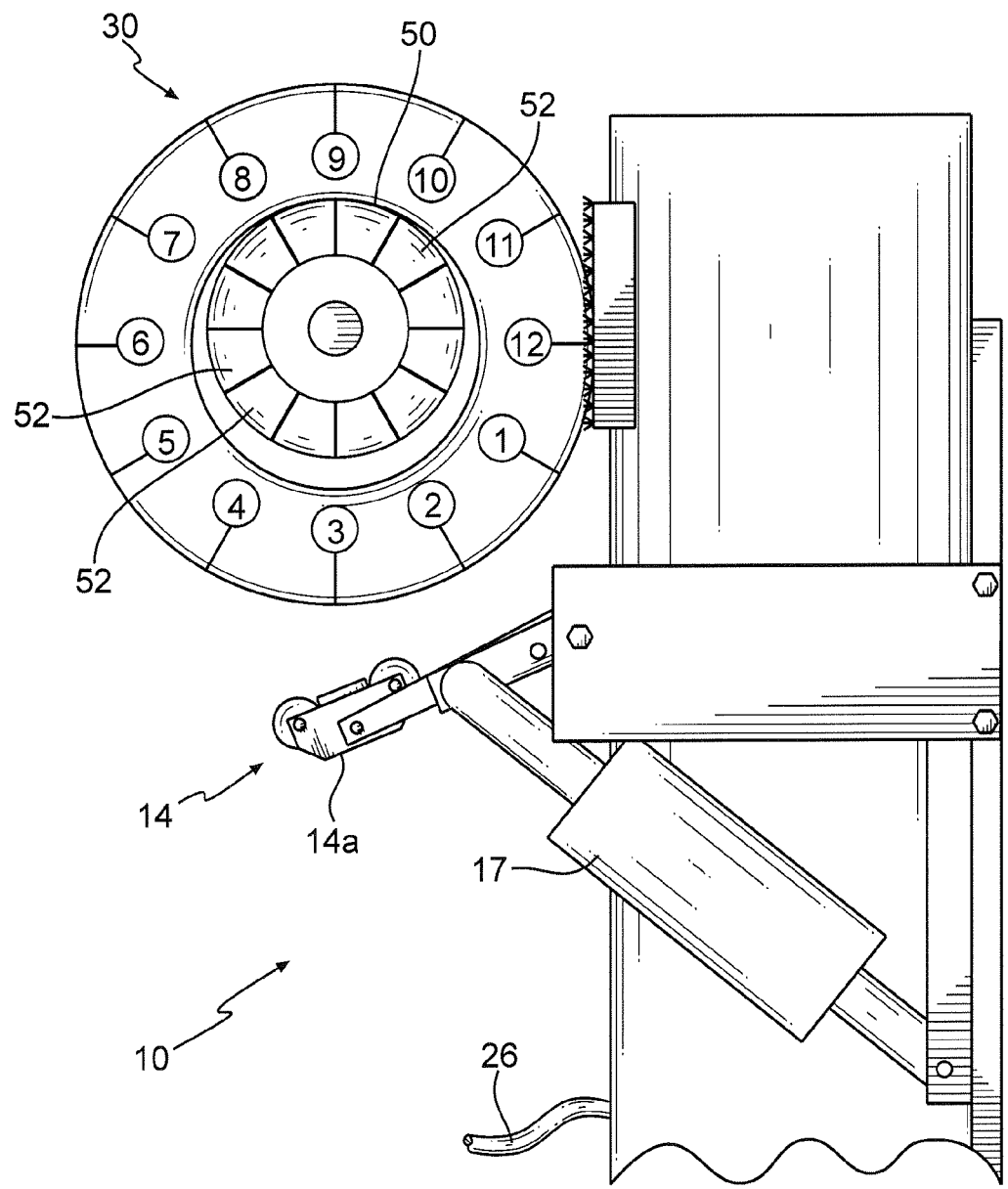
FIG. 12 is a side view of the tire buffing machine and tire of FIG. 10 showing the expandable rim in a retracted or disengaged position, according to an embodiment of the present invention.

Consequently, rims 50 may be able to accept a predetermined range of tire sizes. The segments 52 are generally retained externally by a rubber band that extends around the external circumference of the rim. The band forces the segments radially inward and into a retracted state. When it is desirous to engage a tire, the segments are forced outwardly against the will of the rubber band to engage a tire's bead, as shown in FIGS. 9 and 11. When a tire is to be mounted or dismounted, the segments are retracted as shown in FIG. 12. Conventional (non-expandable) rims 54, as represented in FIG. 2, are not capable of expanding or retracting, and instead require tires to be mounted by maneuvering the tire beads over a rim flange. It is contemplated that the buffing of tire 30 may be performed by one machine, while the disengaging and reengaging of rim 50 may be performed by a second machine.

Variations attributable to expandable rims 50 may be related to inconsistent extension of the segments 52 around rim 50. Such inconsistencies may arise from machine wear and the effects of gravity. As the rubber band is cycled, it may become stretched and lose some of its elasticity. Therefore, the rubber band may loosely and inconsistently constrain the segments 52, which may lead to variable engagement. Further, because the top segments are in contact with or at least are closer to engaging a resting tire, i.e., the non-engaged tire generally hangs from the top segments as shown in FIG. 12, inconsistencies may arise as the top segments engage tire 30 prior to the bottom segments. In the end, engagement of the segments 52 against the tire may not be consistent or non-concentric. This may cause inconsistencies in the tire, or it may correct inconsistencies in the tire, such as, for example, when the maximum thickness is located at the 6 o'clock position. In particular embodiments of the invention, the tire may be rotated during inflation prior to its initial buffing, in an attempt to avoid, reduce, or correct any belt and tread/undertread inconsistencies before the tire is buffed to a predetermined crown radius, and to ultimately avoid or reduce the need to take corrective action and rebuff the tire as disclosed herein.

After a tire has been buffed to a predetermined crown radius, the tire may be scanned or measured by one or more sensors 14a, 18a to determine the maximum distance between the belt 34 and the sensor 14a, 18a, or the maximum buffed crown layer thickness. Machine 10 may also obtain the location of the maximum distance, or any other measured distance, i.e., the angular location of the maximum or measured distance about the tire's rotational axis. It is contemplated that such measurements may be taken manually and regardless of whether the tire is pressurized. As mentioned above, the buffed crown layer thickness may be determined from the distance between the belt 34 and the sensor 14a, 18a by subtracting there from the offset distance 40, i.e., the distance between the sensor and the crown surface. Therefore, when the offset distance 40 is maintained during all measurements, the maximum distance between the belt and the sensor coincides with the maximum buffed crown layer thickness, as shown in FIG. 10.

When measuring the tire, multiple measurements are taken about the circumference of the tire. In one embodiment, these measurements may be taken along a single circumference, i.e., along a circumferential path existing in a plane normal to the rotational axis of the wheel/tire assembly, such as along the tire crown centerline (i.e., along the crown 31 at the tire centerline 36). It is also contemplated that measurements may also be taken along various discrete circumferential paths or locations, and/or transverse locations. Measurements may also be taken as the tire is spinning and the sensor moving transversely across the tire crown 31. The circumferential and/or transverse locations may be taken at particular increments, or may be taken arbitrarily. The measurements may be taken after the tire is finally buffed to the predetermined crown radius, or while the tire is being buffed to the predetermined crown radius, which would alleviate an additional process. The number of locations measured from which the signals are received may vary as widely as circumstances dictate. For instance, one or more measurements may be made relative to each segment of an expandable rim.

In one example, as shown in FIG. 9, twelve (12) measurements may be taken along a circumference of the tire crown, where each measurement location relates to each of the twelve (12) segments 52 of expandable rim 50. The table shown in FIG. 10 provides exemplary measurements taken at each of the twelve (12) locations, after each signal has been interpreted as described above. In an effort to provide more robust values, multiple measurements may be taken along a transverse path at each of the circumferential locations to provide an average measurement at each of the circumferential locations.

Upon review of the measurements, a maximum thickness is to be identified and oriented at a 270 degree polar angle position in relation to the tire/wheel assembly axis of rotation. With regard to the table of FIG. 10, a maximum measurement was taken at location 3. Accordingly, as shown in FIG. 11, the tire is then rotated to orient the maximum distance location at a 270 degree polar angle position from a polar axis of the tire. This orientation may be performed by the machine, as noted above, or manually by an operator. The 270 degree polar angle position, as described above, is the 6 o'clock position or the angular location on the tire that is lowest or closest to the ground. After orienting the maximum distance location at the 270 degree polar angle position, the tire may be deflated. If the tire is mounted on an expandable rim, in a particular embodiment of the invention shown in FIG. 12, the rim 50 may disengage and subsequently re-engage tire 30 by retracting and later extending segments 52 to engage tire 30. The intent of disengaging and reengaging tire 30 at the 270 degree polar angle position is to allow gravity to correct any variation in belt 34 and crown layer, and to expose the corresponding thickened portion of the buffed crown layer for subsequent buffing. Subsequently, the tire is inflated without rotation, while the maximum distance location remains at the 270 degree polar angle position. Finally, the tire is rebuffed at the previous buffing radius, or at a new buffing radius. A new buffing radius may be desired, for example, if it is determined that the buffed crown layer is too thick and additional material needs to be removed from the entire layer, in addition to the removal of excess material at the maximum distance location.

It is contemplated that multiple locations may comprise maximum distance locations. In this situation, any of the multiple locations may be oriented to the 270 degree polar angle position. In the alternative, an average location may be determined among the multiple locations, or a minimum distance location may be used to determine the location to be oriented to the 270 degree polar angle position. For example, a minimum distance location may be opposite, or 180 degrees from, one of a plurality of maximum distance locations. In this example, the maximum distance location opposite the minimum location distance may be oriented to the 270 degree polar angle position.

Particular embodiments of the invention may include evaluating whether a maximum thickness of the buffed crown layer deviates sufficiently enough from the remaining measurements to the corrective actions discussed above. The buffed crown layer may be evaluated by subtracting a minimum undertread layer thickness from a maximum thickness, as shown in FIG. 10, and determining whether the difference is above or below a predetermined threshold value or tolerance, i.e., within a standard deviation limit However, other techniques may also be used to quantify and/or determine the how much the thickness of the material remaining above the belt varies around the tire or the standard deviation thereof, and whether such deviation is within an acceptable level. If it is determined that the difference between a maximum thickness and a minimum distance is beyond a predetermined threshold value, the corrective actions and methods to reduce the maximum thickness will be employed. If, however, the difference is below the threshold, or within a standard deviation limit, then the undertread layer may be considered uniform and corrective action may be avoided.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method for correcting a crown layer variance of a buffed tire carcass, the method comprising the steps of:
    measuring a distance through a buffed crown layer at a plurality of locations around a tire carcass;
    identifying a maximum distance location from the distances measured at the plurality of locations around the tire carcass;
    inflating the tire carcass with the maximum distance location orientated at the 270 degree polar angle position; and,
    buffing the tire carcass.

2. The method of claim 1, wherein the step of measuring comprises the steps of:
    receiving a signal response from a sensor, the signal response generated as a function of distances between the sensor and a belt in the tire carcass;
    determining from the signal response, the distances between the sensor and the belt at a plurality of locations around the tire carcass.

3. The method of claim 1, wherein the measured distance is the thickness of the buffed crown layer.

4. The method of claim 1, further comprising:
    orientating the maximum distance location to a 270 degree polar angle position from a polar axis of the tire before performing the step of inflating.

5. The method of claim 1, further comprising:
    identifying a minimum distance location from the distances measured at the plurality of locations around the tire carcass.

6. The method of claim 4 further comprising:
    calculating the difference between the maximum distance and the minimum distance;
    comparing the difference to a threshold value; and,
    performing the steps of inflating and buffing if the difference is greater than the threshold value.

7. The method of claim 1, further comprising:
    deflating the tire carcass;
    disengaging an expandable rim from the deflated tire carcass while the maximum distance is located at the 270 degree polar angle position; and,
    reengaging the expandable rim with the deflated tire carcass while the maximum distance is located at the 270 degree polar angle position prior to the step of inflating the tire carcass.

8. The method of claim 1, wherein the step of buffing comprises rebuffing the tire carcass at the buffing radius.

9. A computer program product including instructions embodied on a computer readable storage medium, the computer program product acting to correct a crown layer variance of a buffed tire carcass, the computer program comprising:
    measuring instructions for measuring a distance through a buffed crown layer at a plurality of locations around a tire carcass;
    identifying instructions for identifying a maximum distance location from the distances determined at the plurality of locations around the tire carcass;
    inflating instructions for inflating the tire carcass with the maximum distance location orientated at the 270 degree polar angle position; and,
    buffing instructions for buffing the tire carcass.

10. The computer program product of claim 9, wherein measuring instructions comprise:
    receiving instructions for receiving a signal response from a sensor, the signal response generated as a function of distances between the sensor and a belt in the tire carcass;
    determining instructions for determining from the signal response, the distances between the sensor and the belt at a plurality of locations around the tire carcass.

11. The computer program product of claim 9, wherein the measured distance is the thickness of the buffed crown layer.

12. The computer program product of claim 9, further comprising:
    orientating instructions for orientating the maximum distance location to the 270 degree polar angle position from a polar axis of the tire before performing the inflating instructions.

13. The computer program product of claim 9, further comprising:
    identifying instructions for identifying a minimum distance location from the distances determined at the plurality of locations around the tire carcass.

14. The computer program product of claim 13, further comprising:
    calculating instructions for calculating the difference between the maximum distance and the minimum distance;
    comparing instructions for comparing the difference to a threshold value; and,
    performing instructions for performing the steps of inflating and buffing if the difference is greater than the threshold value.

15. The computer program product of claim 9, further comprising:
    deflating instructions for deflating the tire carcass;
    disengaging instructions for disengaging an expandable rim from the deflated tire carcass while the maximum distance is located at the 270 degree polar angle position from a polar axis of the tire; and,
    reengaging instructions for reengaging the expandable rim with the deflated tire carcass while the maximum distance is located at the 270 degree polar angle position from a polar axis of the tire prior to performing the inflating instructions.

16. The computer program product of claim 9, wherein the buffing instructions comprise instructions for rebuffing the tire carcass at the buffing radius.

17. A tire buffing machine for buffing material from a crown of a tire, the buffing machine comprising:
    a sensor that provides a sensor output signal that is a function of a distance between the tire crown surface and a belt in the tire;

a controller, the controller comprising a processor and a memory storage device that stores instructions executable by the processor, such executable instructions including the instructions of claim 9; and a buffing head for buffing the tire.

18. The tire buffing machine of claim 17, the executable instructions further comprising:

identifying instructions for identifying a minimum distance location from the distances determined at the plurality of locations around the circumference of the tire carcass.

19. The tire buffing machine of claim 18, the executable instructions further comprising:

calculating instructions for calculating the difference between the maximum distance and the minimum distance;

comparing instructions for comparing the difference to a threshold value; and, performing instructions for performing the steps of orientating, inflating, and buffing if the difference is greater than the threshold value.

20. The tire buffing machine of claim 17, the executable instructions further comprising:

deflating instructions for deflating the tire carcass;

disengaging instructions for disengaging an expandable rim from the deflated tire carcass while the maximum distance is located at the 270 degree polar angle position from a polar axis of the tire; and, reengaging instructions for reengaging the expandable rim with the deflated tire carcass while the maximum distance is located at the 270 degree polar angle position from a polar axis of the tire prior to the step of re-inflating the tire carcass.

* * * * *

UNITED STATES PATENT AND TRADEMARK OFFICE
CERTIFICATE OF CORRECTION

| | |
|---|---|
| PATENT NO. | : 8,282,442 B2 |
| APPLICATION NO. | : 12/680561 |
| DATED | : October 9, 2012 |
| INVENTOR(S) | : Stephen Manuel and Robert Young |

It is certified that error appears in the above-identified patent and that said Letters Patent is hereby corrected as shown below:

IN THE CLAIMS:

In Column 13; Line 51 (Claim 6), delete the phrase "claim 4" and insert the phrase -- claim 5 --.

Signed and Sealed this
Fourteenth Day of May, 2013

Teresa Stanek Rea
*Acting Director of the United States Patent and Trademark Office*